Patented Feb. 16, 1943

2,311,281

UNITED STATES PATENT OFFICE 2,311,281

METHOD OF PREPARING DISUBSTITUTED CYANAMIDES

Richard O. Roblin, Jr., Stamford, and Ingenuin Hechenbleikner, Greenwich, Conn., assignors to American Cyanamid Company, New York, N. Y., a corporation of Maine No Drawing. Application May 23, 1939, Serial No. 275,226

9 Claims. (Cl. 260—551)

This invention relates to a method of preparing disubstituted cyanamides of the formula—

R and R' being alkyl, aryl or aralkyl radicals.

A known method of converting a disubstituted amine to the corresponding disubstituted cyanamide consists in reacting two mols of the amine with one mol of cyanogen chloride according to the following equation:

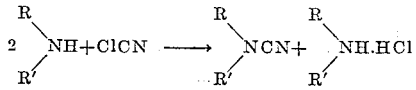

For commercial operation, where economy and efficiency are essential, it is readily seen that this method is not feasible since on a theoretical basis, only 50% of the amine is converted to the cyanamide, whereas the remaining portion reacts with hydrochloric acid liberated in the reaction to form the amine hydrochloride. The amine can be recovered from the hydrochloride involving an extra step in the process.

It is among the objects of this invention to avoid the disadvantages of the above known method and provide a process for the production of disubstituted cyanamides which is highly efficient and simple as to the successful operation thereof.

In practicing this invention, equimolecular quantities of a dissubstituted amine and cyanogen chloride are caused to react in an inert organic solvent such as benzene or petroleum ether fractions. The mixture is then agitated with an amount of aqueous caustic soda sufficient to react with the amine hydrochloride formed and thus regenerate the amine for further reaction with the cyanogen chloride. The reaction cycle continues until substantially all of the amine is converted to the cyanamide. It is highly desirable to keep the reaction mixture cool, as for example at a temperature of approximately 5° C., because if allowed to heat up, yields are lower. This is probably due to side reactions which occur at higher temperatures.

The equation for this reaction is as follows:

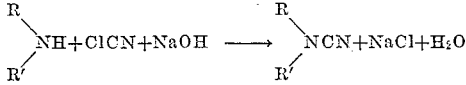

The reaction mixture is washed with dilute hydrochloric acid and then with water to remove any excess of alkali. The water layer containing the sodium chloride is removed. The solvent layer is dried with a drying agent such as anhydrous sodium sulfate. The solvent is removed by distillation under reduced pressure. The disubstituted cyanamide is recovered from the residue either by vacuum distillation or recrystallization from alcohol.

Example I 6.1 grams of cyanogen chloride are dissolved in 100 cc. of benzene. After cooling the solution to 0°–5° C., 24.1 grams of di-n-octyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as di-n-octyl cyanamide.

Example II 6.1 grams of cyanogen chloride are dissolved in 100 cc. of benzene. After cooling the solution to 0°–5° C., 12.9 grams of methyl-n-heptyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as methyl n-heptyl cyanamide.

Example III 6.1 grams of cyanogen chloride are dissolved in 100 cc. of heptane. After cooling the solution to 0°–5° C., 17.7 grams of isoamyl benzyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure.

The residue is vacuum distilled and the product identified as isoamyl benzyl cyanamide.

Example IV 6.1 grams of cyanogen chloride are dissolved in 100 cc. of heptane. After cooling the solution to 0°–5° C., 19.7 grams of p-tolyl benzyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as p-tolyl benzyl cyanamide.

Example V 6.1 grams of cyanogen chloride are dissolved in 100 cc. of benzene. After cooling the solution to 0°–5° C., 16.3 grams of isoamyl phenyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as isoamyl phenyl cyanamide.

Example VI 6.1 grams of cyanogen chloride are dissolved in 100 cc. of heptane. After cooling the solution to 0°–5° C., 29.7 grams of di-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is recrystallized from alcohol and the product identified as di-1-naphthylmethyl cyanamide.

The temperature of the reacting mixture set forth in the above examples need not be within the limits, 0°–5° C., as somewhat higher or lower temperatures may be employed.

The use of the dilute hydrochloric acid wash at the end of the reaction is not essential and may be omitted, if the amount of caustic soda used is such that no appreciable amount thereof remains.

In order to operate this process successfully, it is necessary that the amine be regenerable from its hydrochloride with aqueous alkali. Of all the disubstituted amines utilized in the practice of this invention, the dicyclohexyl amine was the only one found which could not be regenerated from its hydrochloride with aqueous alkali.

In practicing this invention, not half, as experienced in the prior art method, but substantially all of the original quantity of amine may be converted to the disubstituted cyanamide in one step.

While the invention has been described with particular reference to specific embodiments, it is to be understood that it is not to be limited thereto but is to be construed broadly and restricted solely by the scope of the appended claims.

We claim:

1. The method which comprises reacting equimolecular quantities of cyanogen chloride and a disubstituted amine, the hydrochloride of which is reactive with an aqueous alkali solution to regenerate the amine, the amine being carried in an inert organic solvent, thus forming the corresponding disubstituted cyanamide and amine hydrochloride, regenerating quantities of the amine by reacting the same with aqueous alkali, separating and recovering the disubstituted cyanamide.

2. The method which comprises reacting equimolecular quantities of cyanogen chloride and a disubstituted amine, the hydrochloride of which is reactive with an aqueous alkali solution to regenerate the amine, the amine being carried in an inert organic solvent, thus forming the corresponding disubstituted cyanamide and amine hydrochloride, regenerating quantities of the amine by reacting the same with aqueous alkali, said reactions being carried out at a temperature below that at which substantial side reactions will occur, separating and recovering the disubstituted cyanamide.

3. A method of preparing disubstituted cyanamides of the formula—

where R and R' represent a radical chosen from the group consisting of alkyl, aryl and aralkyl, which comprises reacting equimolecular quantities of a corresponding disubstituted amine and cyanogen chloride in an inert organic solvent, regenerating quantities of the amine by reacting the hydrochloride with aqueous alkali, said reactions being carried out at a temperature below that at which substantial side reactions occur, separating and recovering the disubstituted cyanamide.

4. A method of preparing disubstituted cyanamides of the formula—

where R and R' each represent an alkyl radical which comprises reacting equimolecular quantities of a corresponding disubstituted amine and cyanogen chloride in an inert organic solvent, regenerating quantities of the amine by reacting the hydrochloride with aqueous alkali, said reactions being carried out at a temperature below that at which substantial side reactions occur, separating and recovering the disubstituted cyanamide.

5. A method of preparing disubstituted cyanamides of the formula—

where R represents an alkyl radical and R' represents an aryl radical which comprises reacting equimolecular quantities of a corresponding disubstituted amine and cyanogen chloride in an inert organic solvent, regenerating quantities of the amine by reacting the hydrochloride with aqueous alkali, said reactions being carried out at a temperature below that at which substantial side reactions occur, separating and recovering the disubstituted cyanamide.

6. A method of preparing disubstituted cyanamides of the formula—

where R and R' each represent an aralkyl radical which comprises reacting equimolecular quantities of a corresponding disubstituted amine and cyanogen chloride in an inert organic solvent, regenerating quantities of the amine by reacting the hydrochloride with aqueous alkali, said reactions being carried out at a temperature below that at which substantial side reactions occur, separating and recovering the disubstituted cyanamide.

7. A method of preparing di-n-octyl cyanamide which comprises reacting equimolecular quantities of di-n-octyl amine and cyanogen chloride in an inert organic solvent, regenerating quantities of the amine by reacting the hydrochloride with aqueous alkali, said reactions being carried out at a temperature below that at which substantial side reactions occur, separating and recovering the disubstituted cyanamide.

8. A method of preparing isoamyl phenyl cyanamide which comprises reacting equimolecular quantities of isoamyl phenyl amine and cyanogen chloride in an inert organic solvent, regenerating quantities of the amine by reacting the hydrochloride with aqueous alkali, said reactions being carried out at a temperature below that at which substantial side reactions occur, separating and recovering the disubstituted cyanamide.

9. A method of preparing di-1-naphthylmethyl cyanamide which comprises reacting equimolecular quantities of di-1-naphthylmethyl amine and cyanogen chloride in an inert organic solvent, regenerating quantities of the amine by reacting the hydrochloride with aqueous alkali, said reactions being carried out at a temperature below that at which substantial side reactions occur, separating and recovering the disubstituted cyanamide.

RICHARD O. ROBLIN, Jr.
INGENUIN HECHENBLEIKNER.